US008194337B2

(12) United States Patent  (10) Patent No.: US 8,194,337 B2
Ortiz-Gavin  (45) Date of Patent: Jun. 5, 2012

(54) DYNAMIC ALTERNATING PANEL REFLECTOR APPARATUS

(76) Inventor: Sergio Alejandro Ortiz-Gavin, Los Angeles, CA (US)

( * ) Notice: Subject to any disclaimer, the term of this patent is extended or adjusted under 35 U.S.C. 154(b) by 227 days.

(21) Appl. No.: 12/399,924

(22) Filed: Mar. 6, 2009

(65) Prior Publication Data

US 2009/0251813 A1    Oct. 8, 2009

Related U.S. Application Data

(60) Provisional application No. 61/068,579, filed on Mar. 6, 2008.

(51) Int. Cl.
  *G02B 5/22*  (2006.01)
  *G03B 15/02*  (2006.01)
  *F21V 7/00*  (2006.01)
(52) U.S. Cl. ........ 359/891; 362/341; 362/347; 362/348; 362/16
(58) Field of Classification Search .................. 359/891, 359/892, 893; 362/341, 342, 346, 347, 348, 362/352, 354, 360, 361, 16, 17; 396/340
See application file for complete search history.

(56) References Cited

U.S. PATENT DOCUMENTS 4,827,291 A * 5/1989 Guez ............................. 396/340
6,491,405 B1 * 12/2002 Shirilla ........................... 362/16

OTHER PUBLICATIONS

Notification, International Search Report dated Dec. 16, 2010 and Search History for International Application No. PCT/US 10/49143 for Hexadecimal RGB and CMYK Light Reflecting Surfaces and Techniques, six pages.
Written Opinion of the International Searching Authority dated Dec. 16, 2010, International Application No. PCT/US 10/49143 for Hexadecimal RGB and CMYK Light Reflecting Surfaces and Techniques, six pages.

* cited by examiner

*Primary Examiner* — Audrey Y Chang
(74) *Attorney, Agent, or Firm* — Edward C. Schewe

(57) ABSTRACT

Skins for light reflecting umbrellas and for methods of using light reflecting umbrellas. The invention includes skins with a series of panels in stripes of alternating colors, in a shifted configuration, in a checkered shift configuration, in a half and half configuration, in a modified half and half configuration with a center portion having a separate color combination, in a tricolor configuration, in a shifted tricolor configuration and in a center black configuration.

5 Claims, 8 Drawing Sheets

DYNAMIC ALTERNATING PANEL REFLECTOR APPARATUS

RELATED APPLICATION DATA

This application claims the benefit of U.S. Provisional Patent Application Ser. No. 61/068,579 filed on Mar. 6, 2008.

BACKGROUND OF THE INVENTION

1. Field of the Invention

This present invention is directed to improved skins or surfaces for light reflector umbrellas and methods of using light reflecting umbrellas.

2. Description of the Related Art

Photographers use different types of lighting devices to create diffused light for photographing their subjects. Light directly from a light source, such as a strobe, comes in a straight line and can produce harsh, hard shadows on a subject. Conventional devices create soft diffused light by directing light through a diffusing material or by bouncing light off a second surface. A conventional lighting umbrella is one type of light "bouncing" source. In the conventional umbrellas, light from a bulb is bounced off the inside of the metalized umbrella to create a soft indirect light that creates softer shadows on the subject. A need exists for an improved light umbrella that expands the lighting options that photographers can use to shape the light and produce diffuse lighting to photograph their subjects.

SUMMARY OF THE INVENTION

The use of novel skins for light reflecting umbrellas and for methods of using light reflecting umbrellas. The invention described herein can be utilized for skins used with common reflectors known to skilled persons. Embodiments of the invention include the skin having a series of panels in stripes of alternating colors, in a shift configuration, in a checkered shift configuration, in a half and half configuration, in a modified half and half configuration with a center portion having a separate color combination, in a tricolor configuration, in a shifted tricolor configuration and in a configuration with a center portion having a different color. Other embodiments of the invention include the use of sequins secured onto the skin. Other and further advantages will appear to skilled persons from the written disclosure and figures.

DETAILED DESCRIPTION OF THE INVENTION

Reference is made to the figures in which elements of the illustrated embodiments of the invention are given numerical designations so as to enable one skilled in the art to make and use the invention. The shading in the figures is used to identify color as described herein. It is understood that the following description is exemplary of embodiments of the invention and it is apparent to skilled persons that modifications are possible without departing from the inventive concepts herein described.

As described herein, the color champagne includes the typical color of the beverage champagne including pale tints of yellowish orange that are close to a beige color. The term silver includes the well known silver colors including a soft silver color and a hard silver color that includes tints of gray.

As shown in the Figures, a light reflector or umbrella 10 is shown supported on a support 12 in a conventional manner with an attached umbrella skin 14. The umbrella 10 includes the parabolic reflectors known to persons skilled in the art. The umbrella 10 includes a center aperture 16 as shown in FIG. 1 for securing a light source thereto for use in stage, studio, motion picture and still photography.

Figure 1:
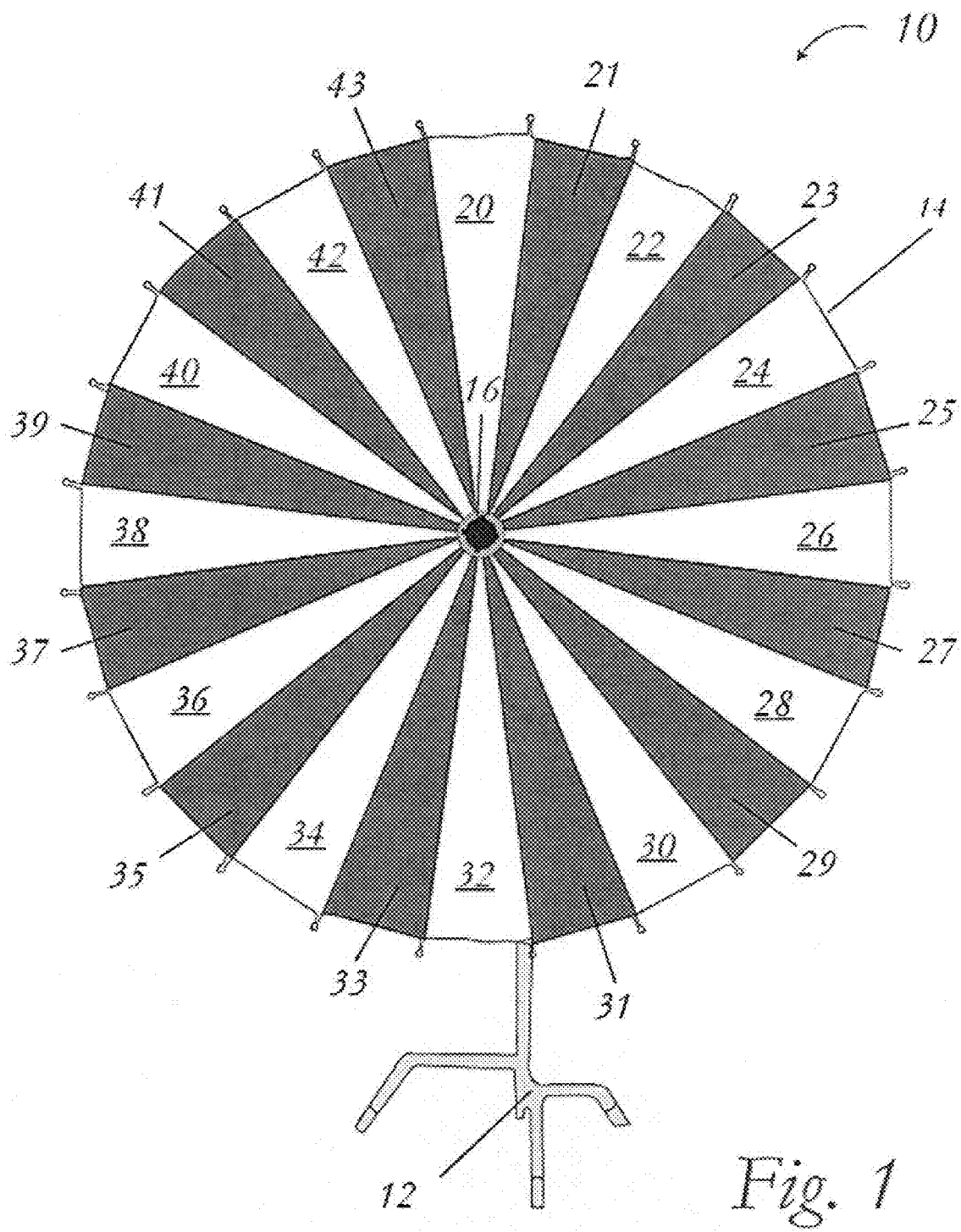
FIG. 1 is an elevation view of embodiments of the invention illustrating one arrangement of panels on the skin.

In the embodiments shown in FIG. 1, the skin 14 is arranged in a series of panels in stripes of alternating colors. The panels 20, 22, 24, 26, 28, 30, 32, 34, 36, 38, 40 and 42 are of one color and the odd numbered panels 21, 23, 25, 27, 29, 31, 33, 35, 37, 39, 41 and 43 are of a color different than the color of the even numbered panels. The even numbered panels are a white color and the odd numbered panels are a different color, including a black color, a champagne color or a silver color. In further embodiments, the even numbered panels are silver in color and the odd numbered panels are a black color or a champagne color. In additional embodiments, the even numbered panels are a champagne color and the odd numbered panels are black in color.

Figure 2:
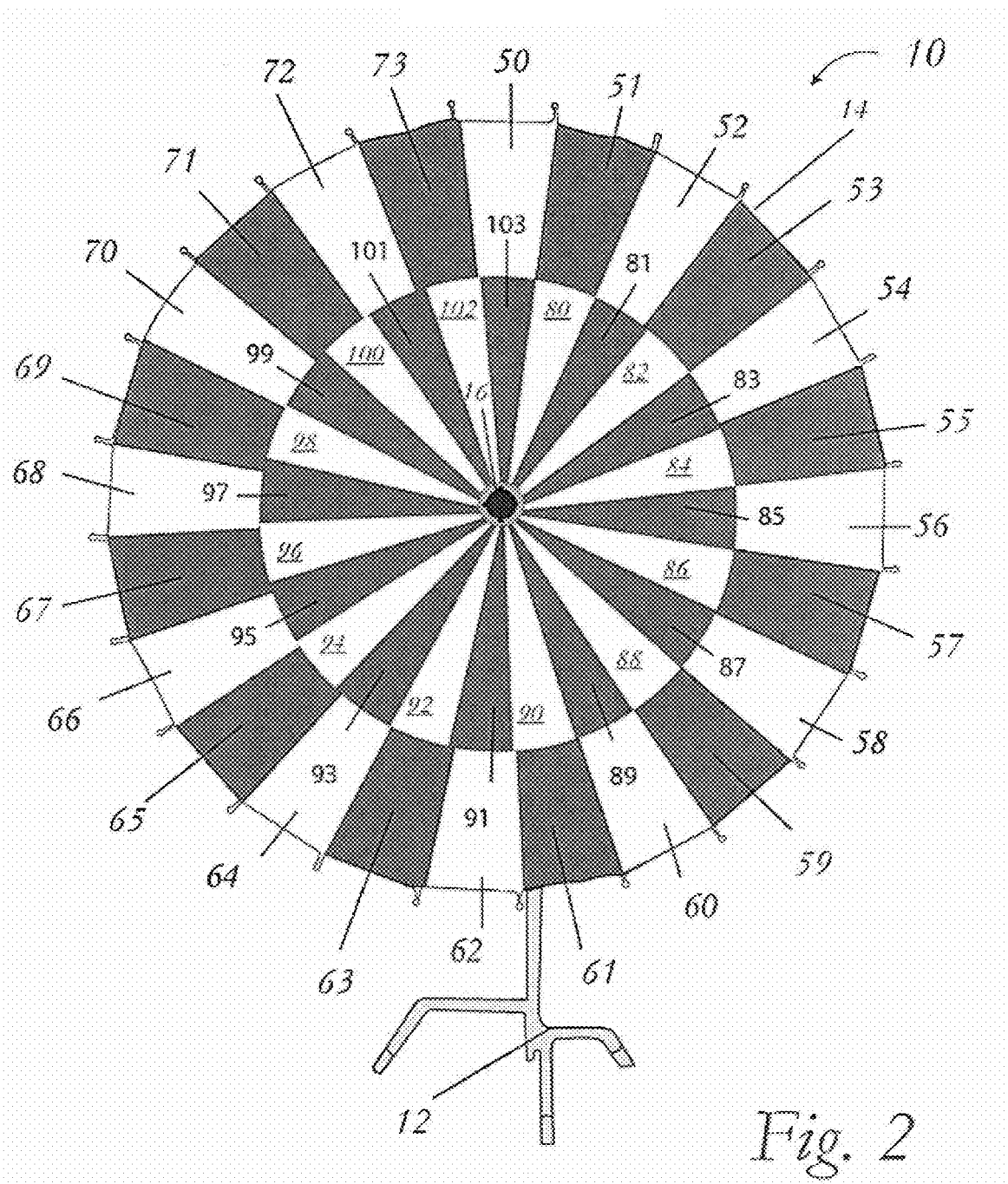
FIG. 2 is an elevation view of embodiments of the invention in a shift configuration.

In FIG. 2, the skin 14 is shown in a shift or shifted configuration from the configuration shown in FIG. 1. Panels numbered 50-73 are arranged on the skin 14 as shown in FIG. 2 with the even numbered panels being of one color and the odd numbered panels a different color. The color combinations for the panels, include, but are not limited to, black and white, gold and white, silver and white and champagne and white. The panels numbered 80-103 are arranged on the skin 14 as shown in FIG. 2 with the even numbered panels being of one color and the odd numbered panels a different color. The same color combinations are available as for panels 50-73. In embodiments of the invention, a panel that is diagonally adjoining a panel in a different ring of panels may be of the same or different color as the adjoining ring and all such color combinations are within the scope of the invention.

Figure 3:
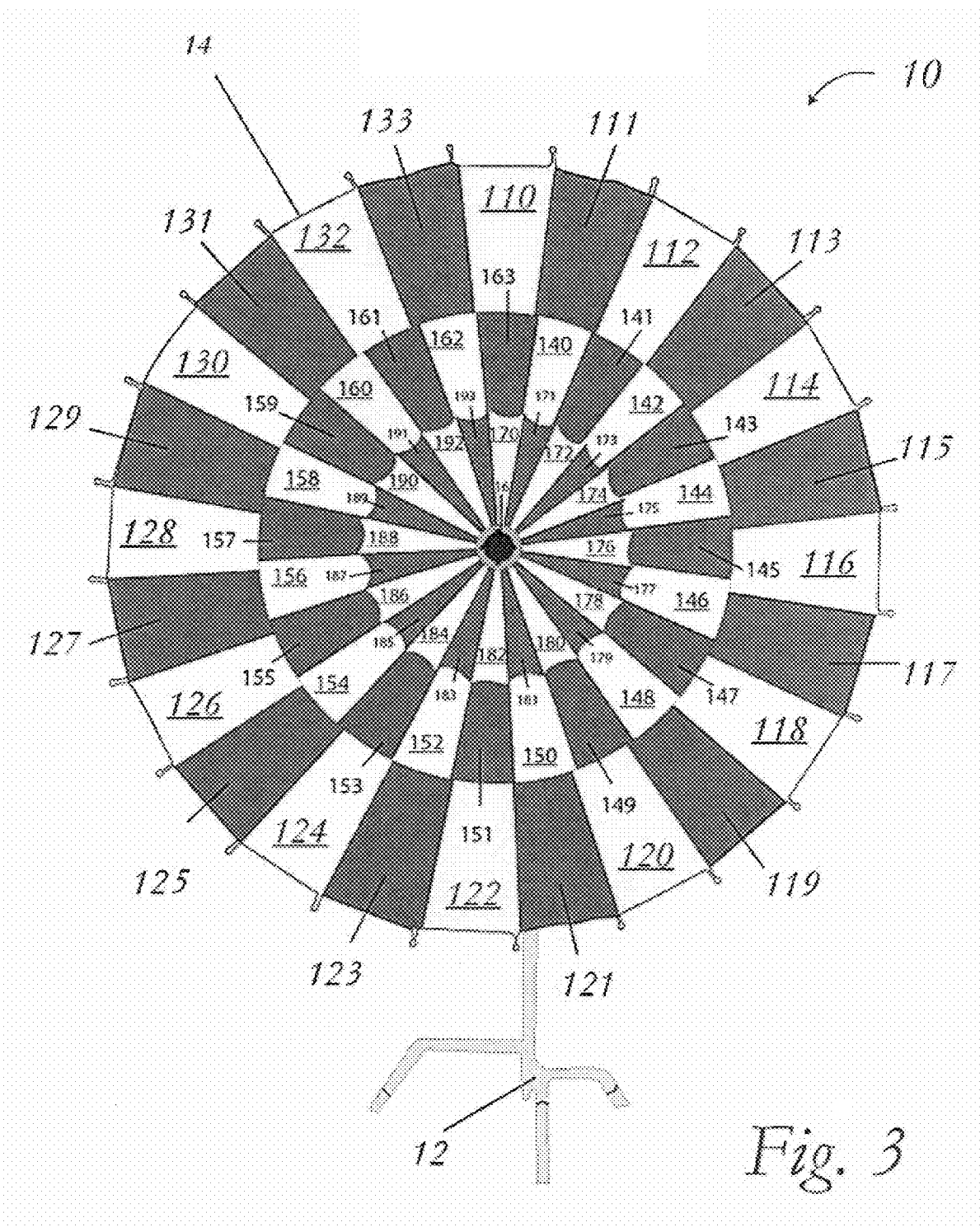
FIG. 3 is an elevation view of embodiments of the invention in a checkered shift configuration.

In embodiments illustrated in FIG. 3, the panels numbered 110-133 are arranged on the skin 14 with the even numbered panels being of one color and the odd numbered panels: a different color. The color combinations for the panels, include, but are not limited to, black and white, gold and white, silver and white and champagne and white. The panels numbered 140-163 are arranged on the skin 14 as shown in FIG. 3 with the even numbered panels being of one color and the odd numbered panels a different color. The same color combinations are available as for panels 110-133.

The panels 170-193 are arranged on the skin 14 with the even numbered panels being of one color and the odd numbered panels a different color. The same color combinations are available as for panels 110-133 and as for panels 140-163. In embodiments of the invention, a panel that is diagonally adjoining a panel in a different ring of panels may be of the same or different color as the adjoining ring and all such color combinations are within the scope of the invention.

Figure 4:
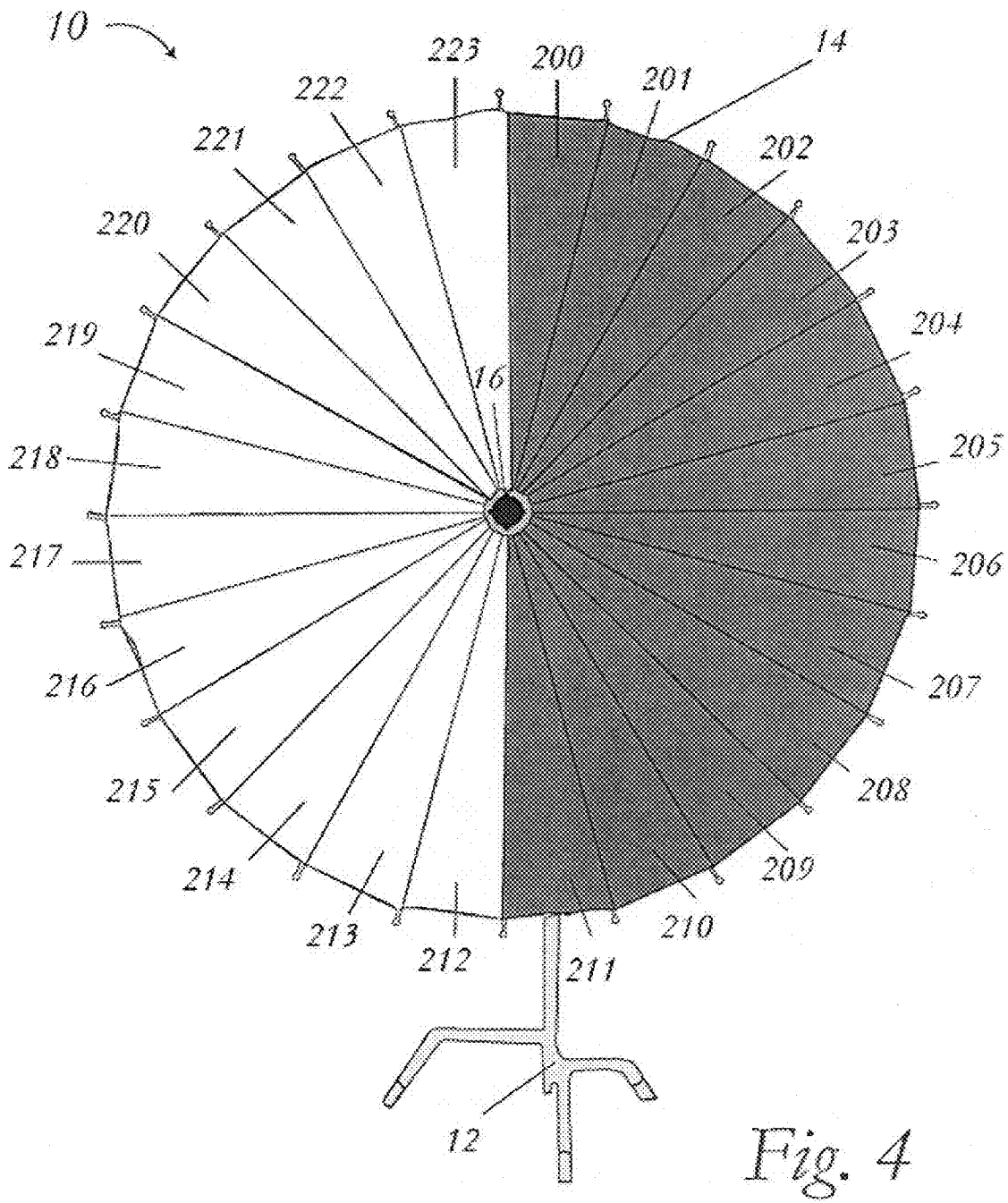
FIG. 4 is an elevation view of embodiments of the invention in a half and half configuration.

In FIG. 4, the panels 200-211 of the skin 14 are of one color and the panels 212-223 are of one color that is different from the color of panels 200-211. The color combinations for the different colored panels include, but are not limited to, black and white, gold and white, silver and white and champagne and white. For example, panels 200-211 are a black color and panels 212-223 are a white color in one embodiment.

Figure 5:
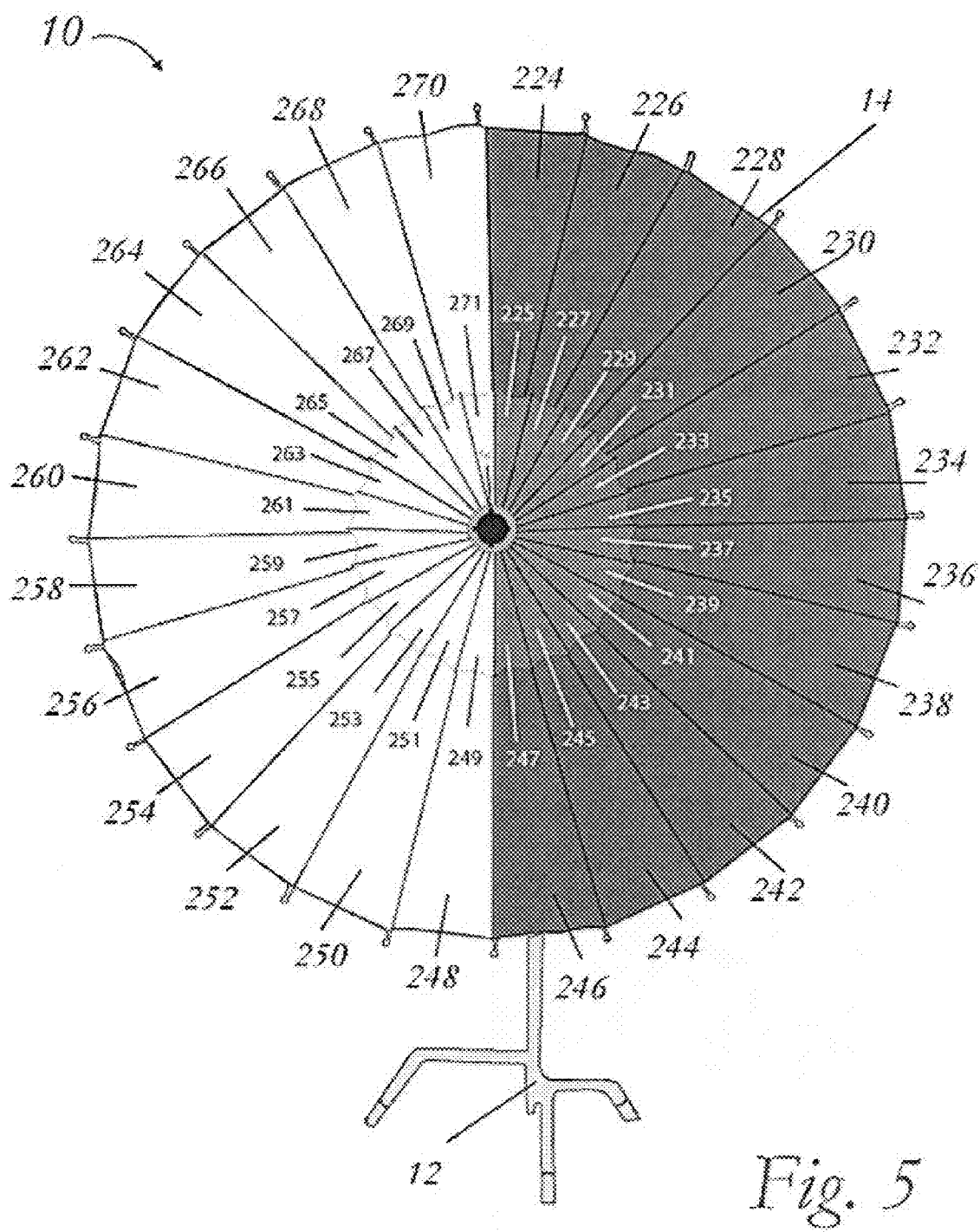
FIG. 5 is an elevation view of further embodiments of the invention in a half and half configuration.

In embodiments illustrated in FIG. 5, the panels 224-246 of the skin 14 are of one color and the panels 248-270 are of a different color. The color combinations for the different colored panels include, but are not limited to, black and white, gold and white, silver and white and champagne and white. Also as shown in FIG. 5, these embodiments include panels 225-247 which are of one color and panels 249-271 that are of a different color. The color combinations for the different colored panels include, but are not limited to, black and white, gold and white, silver and white and champagne and white.

Figure 6:
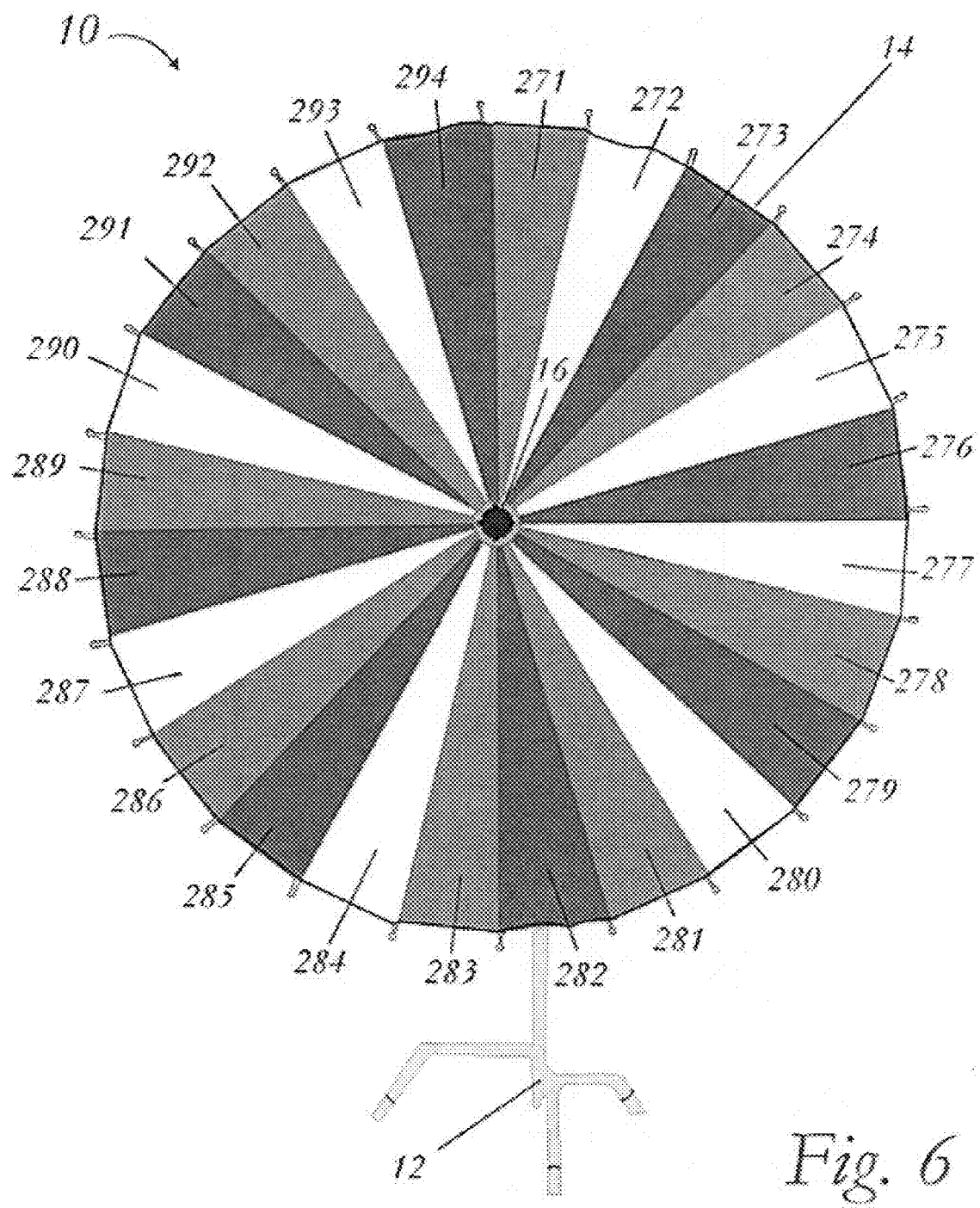
FIG. 6 is an elevation view of embodiments of the invention in a tricolor configuration.

In FIG. 6, the skin 14 is shown in a tricolor configuration. In these embodiments, panels 271-294 are arranged in a striped configuration in three alternating colors. In one or more embodiments, the panel colors alternate from black, to silver and to white and in other embodiments, the panel colors alternate among hard silver, soft silver and white. However, the invention includes any combination of alternating colors.

Figure 7:
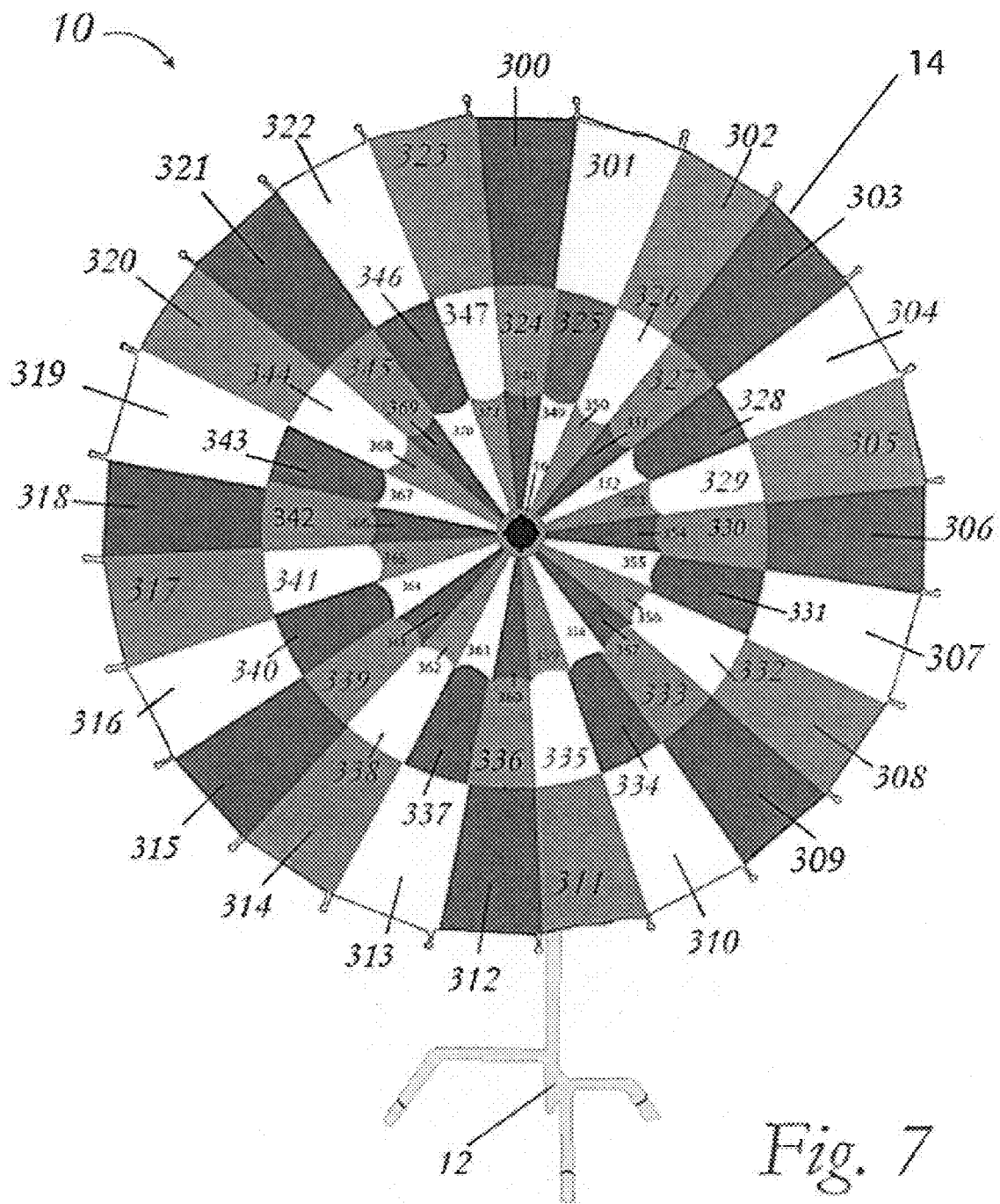
FIG. 7 is an elevation view of embodiments of the invention in a tricolor shift configuration.

In FIG. 7, the skin is shown in a tricolor shift configuration. In these embodiments, the panels numbered 300-322 are arranged on the skin 14 with these panels alternating among three colors. The color combinations for the panels, include, but are not limited to, black, white, gold, silver and champagne. The panels numbered 323-346 are arranged on the skin 14 as shown in FIG. 7 with these panels alternating among three colors. The same color combinations are available as for panels 300-322. The panels 350-373 are arranged on the skin 14 with these panels alternating among three colors. The same color combinations are available as for panels 300-322 and as for panels 323-346. In embodiments of the invention, a panel that is diagonally adjoining a panel in a different ring of panels may be of the same or different color as the adjoining ring and all such color combinations are within the scope of the invention.

Figure 8:
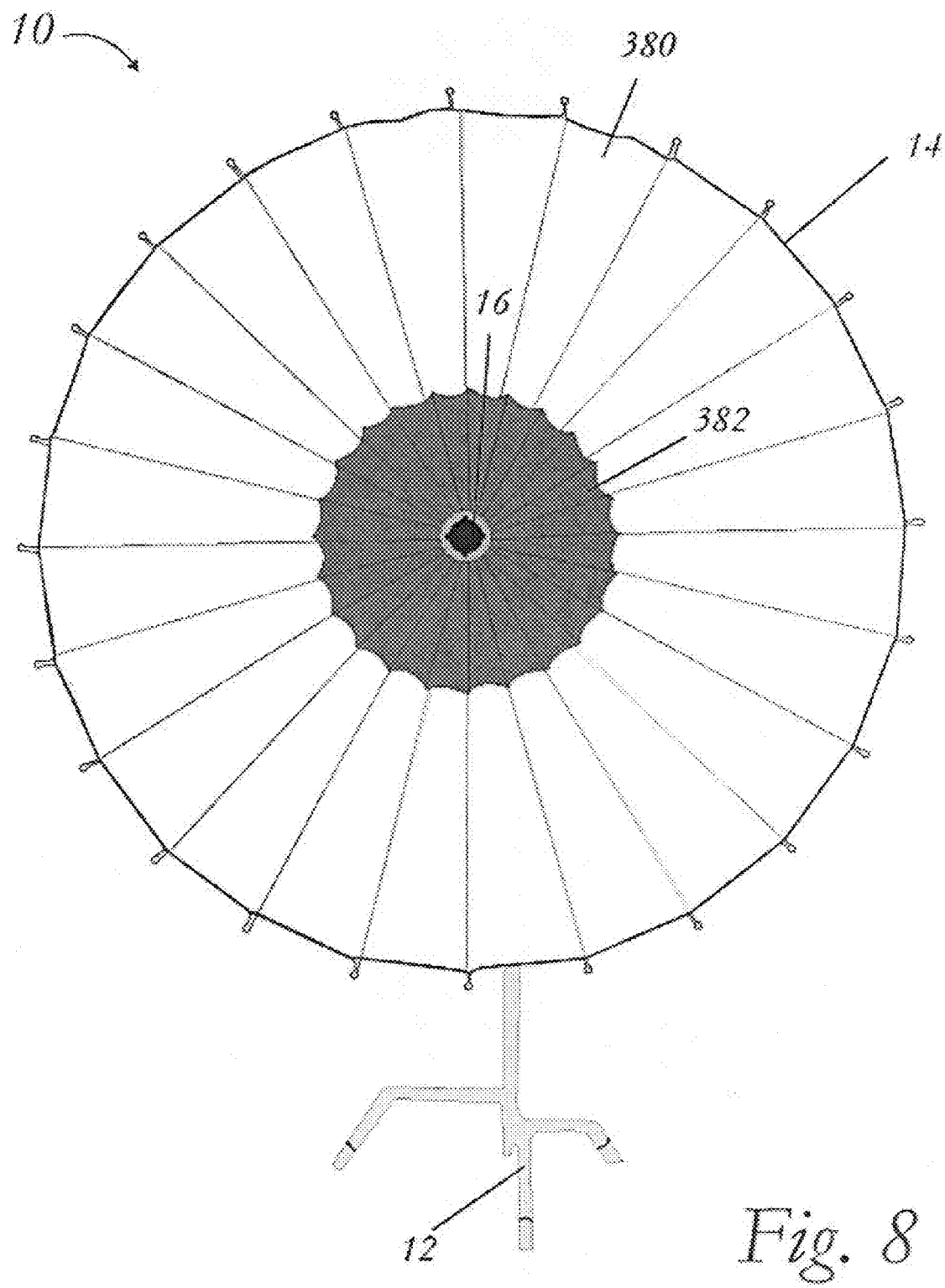
FIG. 8 is an elevation view of embodiments of the invention with a center portion having a separate color.

In FIG. 8, the skin 14 is shown in an embodiment with the center portion 382 having a different color than the exterior portion 380 of the panels. The colors for the center portion 382, include, but are not limited to, black, gold, silver and champagne. The colors for the exterior portion 380 include, but are not limited to, white, silver, gold and champagne.

While the present invention has been described with regards to particular embodiments, it is recognized that additional variations of the present invention may be devised by persons skilled in the art without departing from the inventive concepts disclosed herein and the invention is entitled to the full breadth and scope of the claims.

What is claimed is:

1. A skin adapted to substantially conform to the shape of a light reflector and having a surface adapted to be secured adjacent to a light source within the light reflector, the surface of the skin comprising a series of panels that alternate between a first color and a second color different than the first color, wherein the panels comprise a series of stripes of alternating colors and wherein the panels are arranged in a shift configuration.

2. A skin adapted to substantially conform to the shape of a light reflector and having a surface adapted to be secured adjacent to a light source within the light reflector, the surface of the skin comprising a series of panels that alternate between a first color and a second color different than the first color, wherein the panels comprise a series of stripes of alternating colors and wherein the panels are arranged in a checkered shift configuration.

3. A skin adapted to substantially conform to the shape of a light reflector and having a surface adapted to be secured adjacent to a light source within the light reflector, the surface of the skin comprising a series of panels that alternate between a first color and a second color different than the first color, wherein the panels comprise a series of stripes of alternating colors and wherein the panels are arranged in a half and half configuration.

4. A skin adapted to substantially conform to the shape of a light reflector and having a surface adapted to be secured adjacent to a light source within the light reflector, the surface of the skin comprising a series of panels that alternate between a first color and a second color different than the first color, wherein the panels are arranged to have a center portion of one color and an exterior portion of a different color.

5. A skin adapted to substantially conform to the shape of a light reflector and having a surface adapted to be secured adjacent to a light source within the light reflector, the surface having panels comprising a series of stripes in a tricolor configuration, wherein the panels are in a shifted tricolor configuration.

* * * * *